(12) United States Patent
Taoka et al.

(10) Patent No.: US 8,379,749 B2
(45) Date of Patent: Feb. 19, 2013

(54) TRANSMITTER AND TRANSMISSION METHOD

(75) Inventors: Hidekazu Taoka, Tokyo (JP); Tetsushi Abe, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 488 days.

(21) Appl. No.: 12/664,830

(22) PCT Filed: Jun. 17, 2008

(86) PCT No.: PCT/JP2008/061042
§ 371 (c)(1),
(2), (4) Date: Mar. 19, 2010

(87) PCT Pub. No.: WO2008/156081
PCT Pub. Date: Dec. 24, 2008

(65) Prior Publication Data
US 2010/0189191 A1    Jul. 29, 2010

(30) Foreign Application Priority Data
Jun. 19, 2007    (JP) .................................. 2007-161943

(51) Int. Cl.
*H04B 7/02* (2006.01)
(52) U.S. Cl. ........ 375/267; 375/299; 375/347; 455/101; 455/132
(58) Field of Classification Search .................. 375/267, 375/299, 347; 455/101, 132
See application file for complete search history.

(56) References Cited

U.S. PATENT DOCUMENTS

| | | | |
|---|---|---|---|
| 7,711,032 B2 | 5/2010 | Diaz | |
| 2005/0105629 A1* | 5/2005 | Hottinen et al. | 375/261 |
| 2008/0232493 A1* | 9/2008 | Zhang et al. | 375/260 |
| 2008/0260058 A1* | 10/2008 | Li | 375/260 |
| 2010/0061477 A1* | 3/2010 | Lee et al. | 375/267 |
| 2010/0322349 A1* | 12/2010 | Lee et al. | 375/299 |

FOREIGN PATENT DOCUMENTS

| | | |
|---|---|---|
| JP | 2005-318332 A | 11/2005 |
| WO | 02/17585 A1 | 2/2002 |
| WO | 2006/029050 A2 | 3/2006 |

OTHER PUBLICATIONS

Hong, "Space-time block codes based on precoding" 2003, GLOBECOM '03, IEEE Global Telecommunications Conference, 2003, pp. 636-640 vol. 2.*

Office Action for Russian Application No. 2009149103/07 mailed Jan. 27, 2012, with English translation thereof (12 pages).

(Continued)

*Primary Examiner* — Juan A Torres
(74) *Attorney, Agent, or Firm* — Osha Liang LLP

(57) ABSTRACT

A transmitter includes multiple transmit antennas, a conversion unit configured to generate multiple signal sequences corresponding to a predefined frequency bandwidth from one or more transmission streams associated with any of the transmit antennas, a precoding unit configured to weight the signal sequences with a precoding matrix selected from a codebook including multiple predefined precoding matrices, and a transmitting unit configured to convert an output signal from the precoding unit into a number of signals corresponding to the number of transmit antennas and transmit the converted signals from the transmit antennas. The precoding unit applies distinct precoding matrices to different signal sequences, and an association between the distinct precoding matrices and the different signal sequences is determined through open-loop control being independent of a feedback from a receiver.

51 Claims, 17 Drawing Sheets

OTHER PUBLICATIONS

Samsung, "Further Considerations for CDD Precoding," 3GPP TSG RAN WG1 Meeting #49bis, R1-073097, Jun. 25-29, 2007, 5 pages.
Patent Abstracts of Japan, Publication No. 2005-318332, dated Nov. 10, 2005, 1 page.
Samsung, et al.; "Test Proposal for TS 36.211 Regarding CDD Design," 3GPP TSG RAN WG1 Meeting #49bis, R1-073096, Jun. 25-29, 2007, 3 pages.
LG Electronics, "Link-level Evaluation of the CDD-based Precoding under Open-loop Scenario," 3GPP TSG RAN WG1 Meeting #49bis, R1-072871, Jun. 25-29, 2007, 7 pages.
3GPP TR 25.814 V7.0.0, Jun. 2006, "Physical layer aspects for evolved Universal Terrestrial Radio Access (UTRA)," 126 pages.
3GPP TSG RAN WG Meeting #47bis; R1-070103; "Downlink L1/L2 Control Signaling Channel Structure: Coding," Jan. 15-19, 2007, 17 pages.
3GPP TSG RAN WG1 Meeting #47bis; R1-070236, "Precoding for E-UTRA downlink MIMO," Jan. 15-19, 2007, 3 pages.
3GPP TSG-RAN WG1 #49; R1-072461; "High Delay CDD in Rank Adapted Spatial Multiplexing Mode for LTE DL," May 7-11, 2007, 8 pages.
International Search Report issued in PCT/JP2008/061042, mailed on Sep. 16, 2008, with translation, 9 pages.
Written Opinion issued in PCT/JP2008/061042, mailed on Sep. 16, 2008, 4 pages.

* cited by examiner

TRANSMITTER AND TRANSMISSION METHOD

CROSS-REFERENCE TO RELATED APPLICATIONS

This patent application is a national phase application of international application number PCT/JP2008/061042, filed on Jun. 17, 2008, and claims priority to Japanese Application No. 2007-161943, filed on Jun. 19, 2007, the entire contents of which are hereby incorporated by reference.

TECHNICAL FIELD

The present invention relates to the technical field of mobile communications and more particularly relates to a transmitter having multiple antennas and a transmission method.

BACKGROUND ART

In this technical field, research and development for next-generation mobile communication schemes are accelerated. $3^{rd}$ Generation Partnership Project (3GPP) being a standardization organization for Wideband Code Division Multiple Access (W-CDMA) is considering LTE (Long Term Evolution) as a successor communication scheme for the W-CDMA, HSDPA and/or HSUPA. In the LTE, an OFDM (Orthogonal Frequency Division Multiplexing) scheme and a SC-FDMA (Single-Carrier Frequency Division Multiple Access) scheme will be used as a downlink radio access scheme and an uplink radio access scheme, respectively. For example, see 3GPP TR 25.814 (V7.0.0), "Physical Layer Aspects for Evolved UTRA", June 2006.

The OFDM scheme is a multi-carrier scheme where a frequency band is segmented into smaller frequency bands (subcarriers) and data is transmitted over the individual frequency bands. According to the OFDM scheme, the subcarriers are densely arranged and partially overlapped without mutual interference, which can achieve faster transmissions and improve frequency utilization efficiency.

The SC-FDMA scheme is a single-carrier scheme where a frequency band is segmented into several frequency subbands and multiple terminals use the different frequency subbands for transmissions to reduce interference between the terminals. According to the SC-FDMA scheme, transmit power has smaller variations, which can reduce power consumption at the terminals and achieve broader coverage.

The LTE is a communication system where both one or more uplink physical channels and one or more downlink physical channels are shared among multiple user apparatuses. These channels shared among the multiple user apparatuses are generally referred to as shared channels. In the LTE, uplink communications are conducted in PUSCHs (Physical Uplink Shared Channels) while downlink communications are conducted in PDSCHs (Physical Downlink Shared Channels).

In a communication system using the shared channels, it is necessary to signal to which user apparatuses the shared channels are to be assigned for each subframe (1 ms in the LTE). In the LTE, control channels used for this signaling are referred to as PDCCHs (Physical Downlink Control Channels) or DL (Downlink)-L1/L2 Control Channels. For example, the PDCCH may include some information items such as downlink scheduling information, acknowledgement information (ACK/NACK), uplink scheduling grant, overload indicators and transmit power control command bits. For example, see R1-070103, Downlink L1/L2 Control Signaling Channel Structure Coding.

The downlink scheduling information and the uplink scheduling grant are used to signal to which user apparatuses the shared channels are to be assigned. For example, the downlink scheduling information may include information items for downlink shared channels such as assignment information of downlink resource blocks (RBs), IDS for UEs, the number of streams in multiple input multiple output (MIMO), precoding vector information, data sizes, modulation schemes and HARQ (Hybrid Automatic Repeat reQuest) information. On the other hand, the uplink scheduling grant may include information items for uplink shared channels such as assignment information of uplink resource blocks, IDS for UEs, data sizes, modulation schemes, uplink transmit power information and demodulation reference signal information in uplink MIMO.

A MIMO (Multiple Input Multiple Output) scheme is a multi-antennas type communication designed for faster and higher quality signal transmission by using multiple antennas. In addition, directivity controlled beams can be transmitted to communication opponents by duplicating a transmitted signal stream and combining the duplicated signals streams with appropriate weights. This is referred to a precoding scheme, and the applied weights are referred to a precoding vector or more generally are referred to a precoding matrix.

FIG. 1 schematically illustrates an exemplary precoding operation. Each of two streams (transmitted signals 1, 2) is duplicated into two streams at duplication units, and each of the two streams is multiplied with a precoding vector. Then, the streams are combined and transmitted as illustrated. The precoding is classified into a closed-loop scheme and an open-loop scheme. In the closed-loop scheme, the precoding vector is adaptively controlled to have appropriate values based on feedbacks from the receiver side (user apparatus) unlike the open-loop scheme. In FIG. 1, an exemplary closed-loop operation is illustrated. In the precoding scheme, individual streams are separately transmitted in space, which can greatly improve quality of the individual streams.

Meanwhile, a technique referred to as delay diversity or cyclic delay diversity (CDD) is proposed. In this technique, a number of duplications corresponding to the number of antennas are generated for a signal to be transmitted, and different path delays from the duplication units to the antennas are set for the duplicated signals. Since the same signal is transmitted at different timings, the technique is preferred for achieving uniform quality of the signal over different streams.

As illustrated in FIG. 2, the same signals are transmitted from multiple antennas at different timings. The receiver side receives the signals as several paths and combines them, which can lead to diversity effect.

In addition, the precoding may be combined with the CDD to gain quality improvement by both the precoding and the CDD. In this case, transmitted signals may have different characteristics depending on whether signal processing for the precoding or signal processing for the CDD is carried out prior to the other.

FIG. 3 schematically illustrates exemplary signal processing for the CDD after signal processing for the precoding has been carried out. FIG. 4 illustrates components in FIG. 3 in detail. In this illustration, $N_{FFT}$ represents a fast Fourier transform (FFT size, $\tau$ represents an amount of delay, and $S_{kn}$ represents the n-th stream of the k-th subcarrier.

As illustrated in FIG. 4, operations on individual signal components are represented in a matrix form, and a matrix operation ($D_k$) for the CDD and a matrix operation (F) for the precoding are not commutative in general. For this reason, among the two successively conducted signal operations, the latter may more significantly affect signals to be transmitted. In the illustrated example, the signal quality improvement effect by the CDD is brought out more significantly, and thus there is a higher likelihood that the signal quality may be averaged over transmitted streams. On the other hand, the signal quality improvement effect by the precoding may be weakened. This scheme may be advantageous to the open-loop type precoding in that a precoding vector is fixed. In FIG. 4, the precoding vector is denoted as "F" and works as a weighting factor. This type of scheme is disclosed in 3GPP R1-070236, "Precoding for E-UTRA downlink MIMO", LG Electronics, Samsung and NTT-DoCoMo, for example.

FIG. 5 schematically illustrates exemplary signal processing for the precoding after signal processing for the CDD has been carried out. FIG. 6 illustrates components in FIG. 5 in detail. Also in this case, the latter signal processing may more significantly affect a signal to be transmitted. Thus, in the illustrated example, the signal quality improvement effect by the precoding is brought out more significantly and may be advantageous to the quality improvement for individual streams. On the other hand, the signal quality improvement effect by the CDD may be weakened. For this reason, it is preferable that precoding vectors be controlled adaptively. In FIG. 5, the precoding vectors are denoted as "$U_i$". From a reserved set of P precoding vectors $\{U_1, U_2, \ldots, U_P\}$, an optimal vector $U_i$ determined based on a feedback signal from a communication opponent is selected adaptively. In other words, this scheme is advantageous to the closed-loop precoding. This type of scheme is disclosed in 3GPP R1-072461, "High Delay CDD in Rank Adapted Spatial Multiplexing Mode for LTE DL", Ericsson, for example.

DISCLOSURE OF INVENTION

Problem to be Solved by the Invention

Meanwhile, precoding vector control in the closed-loop precoding is greatly advantageous from the viewpoint of the signal quality in that individual streams are transmitted separately in space. However, it is necessary to switch transmitted beams adaptively depending on communication opponents (user apparatuses). Thus, if the communication opponents are moving fast, this control may be difficult. In this case, the signal quality improvement by the CDD may be better effected than the precoding. In other words, it may be advantageous that the precoding is first performed as illustrated in FIGS. 3 and 4 and then greater delay diversity effect by the CDD can be sought. In this manner, if the precoding is combined with the CDD, the first scheme as illustrated in FIGS. 3 and 4 and the second scheme as illustrated in FIGS. 5 and 6 may or may not be advantageous depending on communication states.

FIG. 7 illustrates an exemplary solution conceived from the above-mentioned viewpoint. In the illustrated example, signal processing units for both the first and second schemes are provided so that the first and second schemes can be applied, and these schemes are switched adaptively depending on communication states. In this arrangement, however, the two signal processing units for the CDD corresponding to "$D_1$ through $D_k$" in FIGS. 4 and 6 must be provided, resulting in complicated arrangement of a transmitter.

Thus, one object of the present invention is to simplify a transmitter having multiple transmit antennas and enabling delay diversity and precoding.

Means for Solving the Problem

In order to solve the above-mentioned problem, one aspect of the present invention relates to a transmitter including: multiple transmit antennas; a conversion unit configured to generate multiple signal sequences corresponding to a predefined frequency bandwidth from one or more transmission streams associated with any of the transmit antennas; a precoding unit configured to weight the signal sequences with a precoding matrix selected from a codebook including multiple predefined precoding matrices; and a transmitting unit configured to convert an output signal from the precoding unit into a number of signals corresponding to the number of transmit antennas and transmit the converted signals from the transmit antennas, wherein the precoding unit applies distinct precoding matrices to different signal sequences, and an association between the distinct precoding matrices and the different signal sequences is determined through open-loop control being independent of feedback from a receiver.

Advantage of the Invention

According to the aspect of the present invention, it is possible to simplify a transmitter having multiple transmit antennas and enabling delay diversity and precoding.

LIST OF REFERENCE SYMBOLS

Figure 1:
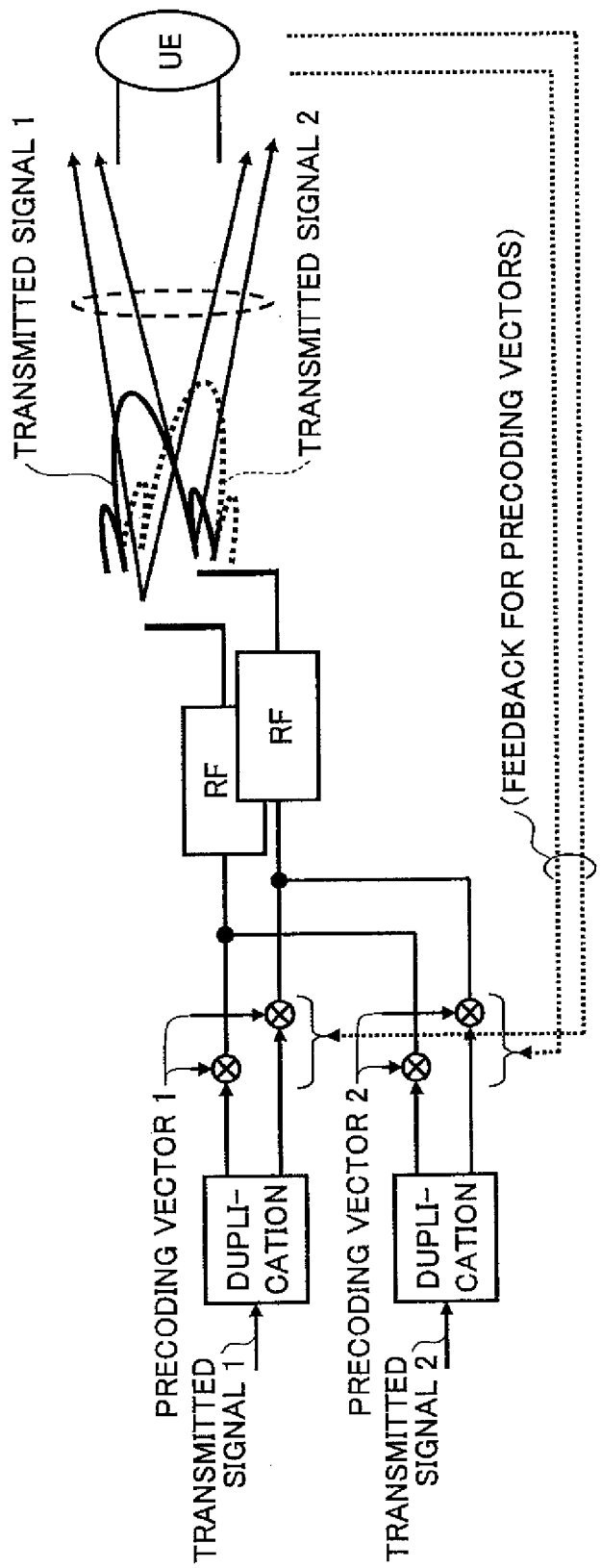
FIG. 1 schematically illustrates an exemplary precoding operation.
Figure 2:
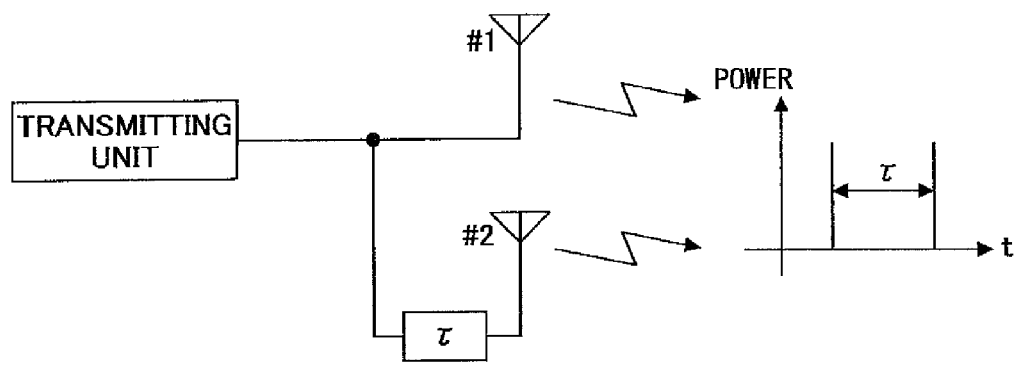
FIG. 2 schematically illustrates principle of delay diversity.

902: signal generation unit
904: serial to parallel conversion unit (S/P)

906: precoding unit
908: parallel to serial conversion unit (P/S)
910: IFFT unit
912: codebook
914: selector
916: subcarrier mapping unit
918: mode switching unit

BEST MODE FOR CARRYING OUT THE INVENTION

Figure 5:
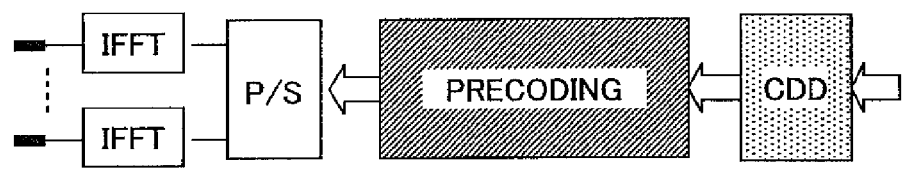
FIG. 5 schematically illustrates a second arrangement of a transmitter enabling CDD and precoding.
Figure 6:
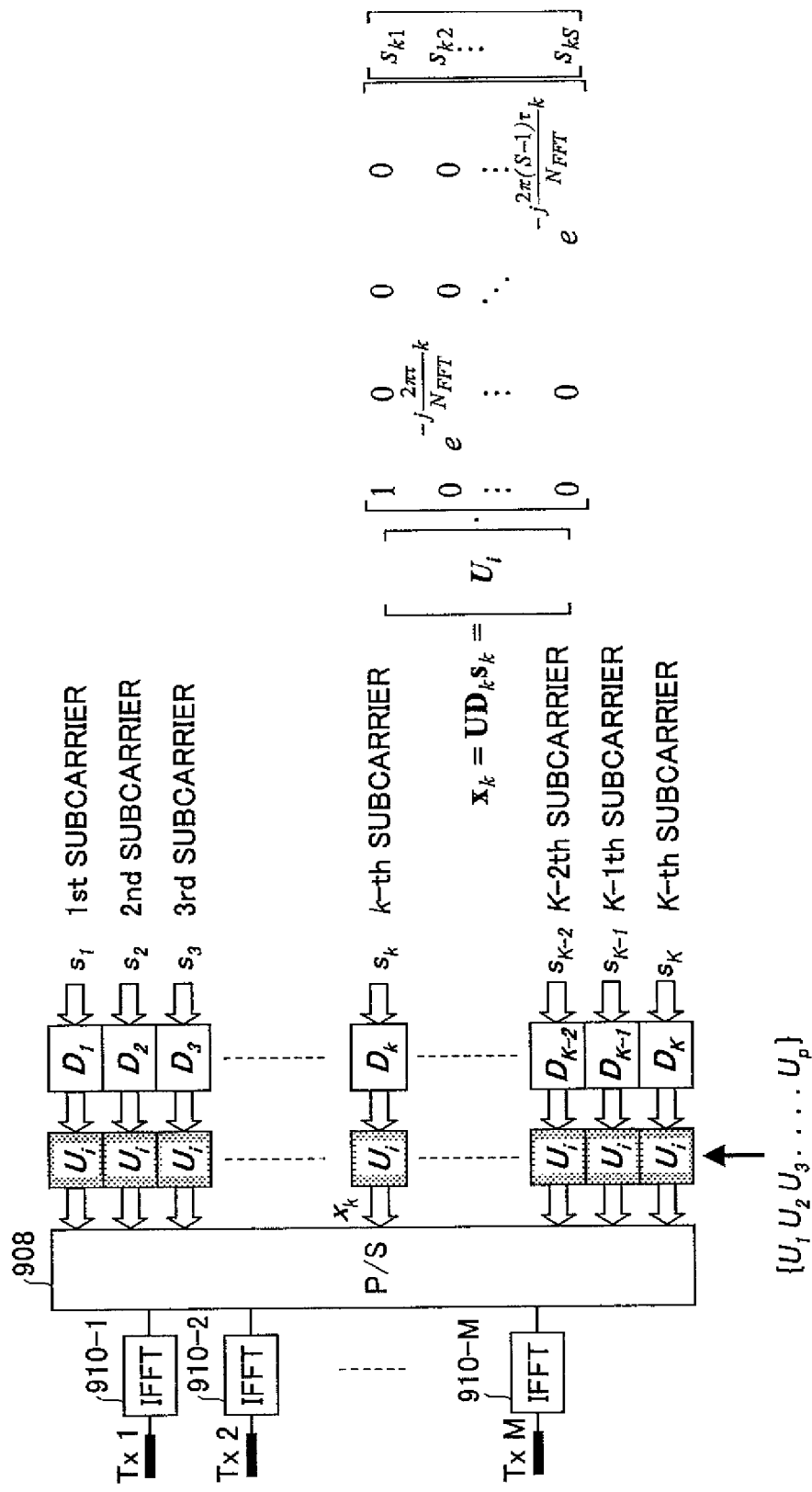
FIG. 6 illustrates the transmitter in detail.
Figure 8:
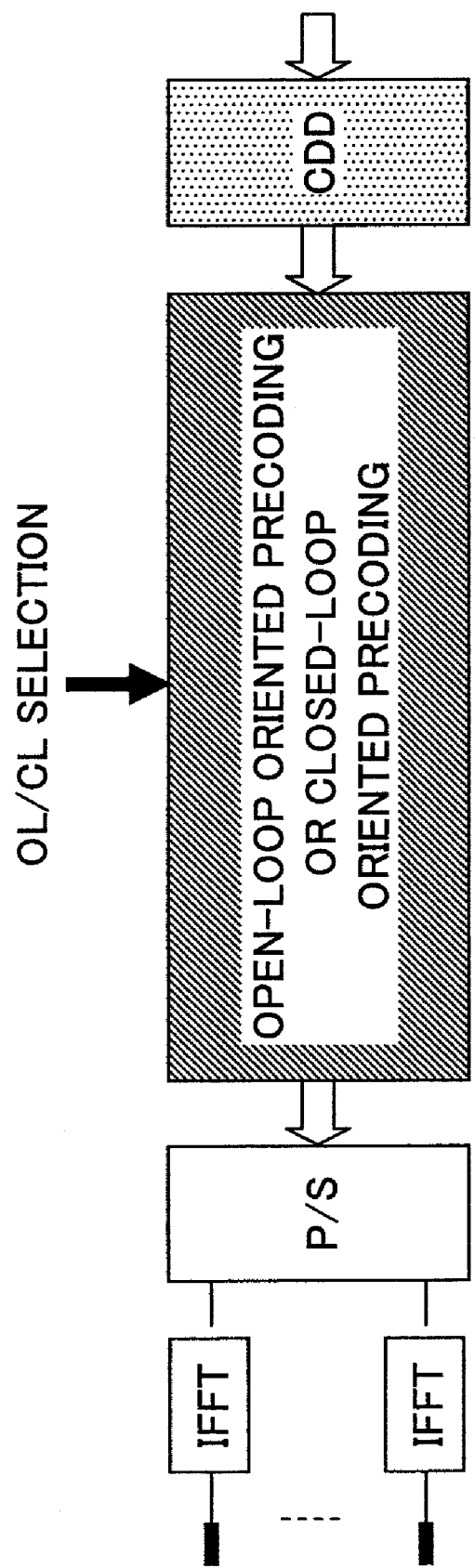
FIG. 8 schematically illustrates an exemplary arrangement of a transmitter according to one embodiment of the present invention.

As illustrated in FIG. 8, according to one aspect of the present invention, two operating modes, a closed-loop mode and an open-loop mode, are provided for a transmitter. In the closed-loop mode, similar to conventional schemes, a precoding vector is changed into an appropriate one depending on a feedback signal from a communication opponent, as illustrated in FIGS. 1, 5 and 6. This operating mode is advantageous in the case where the communication opponent is traveling slowly. In the open-loop mode, different precoding operations are performed from those in the closed-loop mode. In a transmitter according to one aspect of the present invention, predefined distinct precoding vectors are applied to different subcarrier signal sequences. Incidentally, it is assumed under the closed-loop mode that approximately constant propagation channels are used for a certain number of successive subcarriers. Based on feedback from a user apparatus, the same precoding is applied to the constant subcarriers.

Applying different weights to the respective subcarriers corresponds to introduction of temporal delay into transmission signals. Even in the open-loop mode, the application of different weights to the respective subcarriers can improve signal quality due to the CDD. An association between distinct precoding vectors and different subcarriers is easily and quickly determined through open-loop control independently of feedback from a receiver. In addition, as illustrated in FIG. 8, duplicated CDD signal processing units do not have to be provided. In this manner, it is possible to simplify the transmitter having multiple transmit antennas and enabling delay diversity and precoding.

According to one embodiment of the present invention, the precoding unit may apply distinct precoding vectors to the same signal sequence at different time points. In the above embodiment, the distinct precoding vectors are used in such a manner that they are arranged in the frequency direction while they are used in such a manner that they are arranged in the temporal direction in this embodiment. In a further embodiment, the distinct precoding vectors may be used in such a manner that they are arranged in both the frequency direction and the temporal direction. Associations between the distinct precoding vectors and the different subcarriers and/or temporal timings can be determined easily and rapidly through the open-loop control independent of feedback from a receiver.

The number P of distinct precoding vectors may be an integral multiple of the total number of subcarriers corresponding to one resource block or a submultiple of the total number of subcarriers corresponding to one resource block. In this manner, the individual precoding vectors can be used with almost the same frequency, which is preferred to make delay diversity effect uniform.

The distinct precoding vectors $U_1, \ldots, U_P$ may be cyclically used for the distinct signal sequences or at the different time points. This is preferred for simplified distinction of the precoding vectors applied to different signals.

A certain precoding vector may be commonly applied to multiple signal sequences corresponding to adjacent subcarriers while another precoding vector may be commonly applied to multiple signal sequences corresponding to other adjacent subcarriers. Particularly, only one type of precoding vector may be used for one resource block. This is preferred to determine noise level or interference level for each resource block accurately for improvement of scheduling and throughput.

The transmitter may have operating modes including an open-loop mode and a closed-loop mode. In the closed-loop mode, the precoding vectors may be selected from a codebook including multiple predefined precoding vectors. In addition, the precoding vectors for use in the open-loop mode may be also selected from the codebook. The precoding vectors are selected from the codebook in any of the operating modes, which is preferred for shared processing elements.

The operating modes for the transmitter may be switched upon request from a communication opponent, such as a user apparatus, that initiates fast traveling. This is preferred for rapid mode switching for communications destined for the transmitter.

Weights for cyclic delay diversity may be applied to signal sequences supplied from the conversion unit. This is preferred for usage of existing delay diversity operations without modification.

For convenience, the present invention has been described with reference to the distinct embodiments, but separation of the embodiments is not essential to the present invention, and two or more of the embodiments may be used together as needed. Some specific numerals have been used to facilitate understanding of the present invention, but unless specifically stated otherwise, these numerals are simply illustrative and any other appropriate values may be used.

First Embodiment

Functional Block of a Transmitter

Figure 9:
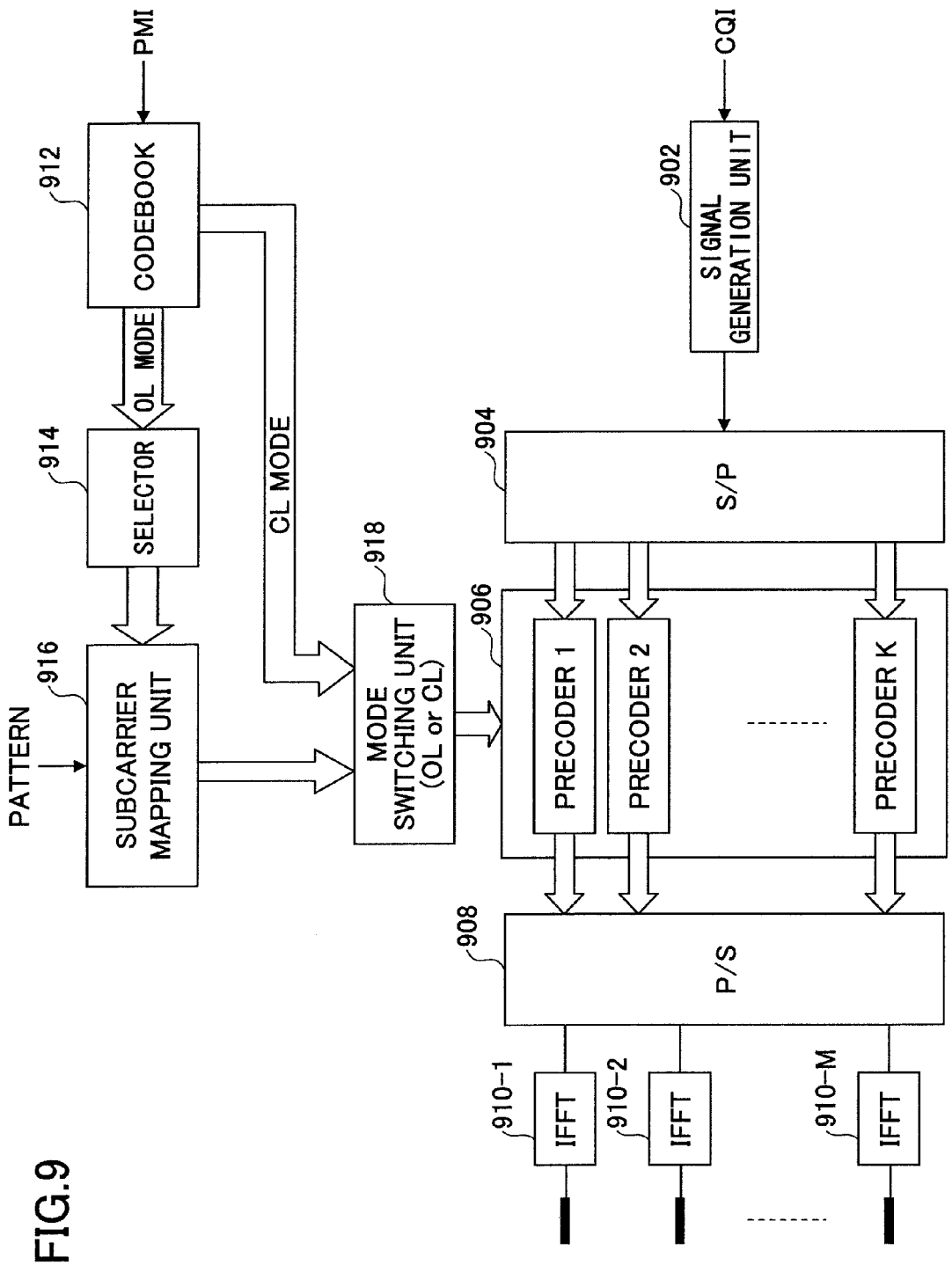
FIG. 9 is a functional block diagram illustrating a transmitter according to one embodiment of the present invention.

FIG. 9 is a functional block diagram illustrating a transmitter according to one embodiment of the present invention. The transmitter is described below as a base station apparatus communicating with user apparatuses in a mobile communication system but may be arranged as any other apparatus. The mobile communication system is a system where the OFDM scheme is applied to downlinks, such as a LTE system. In FIG. 9, a signal generation unit 902, a serial to parallel conversion unit (S/P) 904, a precoding unit 906, a parallel to serial conversion unit (P/S) 908, IFFT units 910-1 through 910-M, a codebook 912, a selector 914, a subcarrier mapping unit 916 and a mode switching unit 918 are illustrated.

The signal generation unit 902 generates downlink signals. The generated signals may be any appropriate signals transmitted in accordance with the OFDM scheme eventually. In one example, the signal generation unit 902 determines a data modulation scheme, a channel coding scheme, a transmit power level and/or others for a signal to be transmitted to a communication opponent based on a Channel Quality Information (CQI) reported from the communication opponent (which is typically a user apparatus) and performs some operations corresponding to the determination. Also, the number of streams may be determined depending on a downlink traffic amount, the number of transmit antennas, the number of receive antennas at the user apparatus and/or others.

The serial to parallel conversion unit (S/P) 904 converts an incoming transmitted stream into a number of signal sequences corresponding to the number of subcarriers included in a predefined frequency band. The signal sequences have a number of components corresponding to the number of transmit antennas. For example, a signal sequence $s_k$ associated with the k-th subcarrier includes S signal components $s_{k1}, s_{k2}, \ldots, s_{kS}$. S represents the number of transmitted streams. The number of transmitted streams S is an integer smaller than or equal to the number of transmit antennas. The predefined frequency band may be a system band such as 5 MHz, 10 MHz or 20 MHz.

The precoding unit 906 weights the respective signal sequences for the subcarriers with precoding vectors. In the illustrated embodiment, the total number of subcarriers is equal to K, and the precoding unit 906 has K precoders. Operations at the precoders 1 through K are subsequently described. For convenience, precoding vectors are used below, but the precoding vectors may be more generally referred to as precoding matrices.

The parallel to serial conversion unit (P/S) 908 performs operations inverse to the serial to parallel conversion unit 904. The parallel to serial conversion unit 908 converts incoming signal sequences corresponding to the number of subcarriers into a number of streams used for transmissions.

Each of the IFFT units 910-1 through 910-M converts incoming transmission streams into transmission symbol streams in accordance with the OFDM scheme. For example, the IFFT unit 910-1 generates a transmission symbol stream to be transmitted from the first transmit antenna and performs inverse fast Fourier transform (IFFT) and modulation in accordance with the OFDM scheme. For simplicity, some operations such as addition of cyclic prefixes, digital to analog conversion, frequency conversion, band limiting and power amplification are omitted in the illustration.

The codebook 912 stores several precoding vectors. For example, P precoding vectors $U_1, U_2, \ldots, U_P$ may be provided in the codebook 912 in advance. In closed-loop (CL) precoding vector control, any precoding vector, such as $U_i$, is selected from the P precoding vectors based on a feedback signal from a communication opponent (user apparatus) and is supplied to the precoding unit 906 via the mode switching unit 918. The feedback signal from the communication opponent is referred to as a precoding matrix indicator (PMI) and identifies any of the P precoding vectors. Typically, the user apparatus determines the PMI.

In the case where the transmitter operates in an open-loop mode rather than in a closed-loop mode, the selector 914 is used. The selector 914 selects any precoding vector from the codebook 912 in accordance with predefined determination criteria. The predefined determination criteria are subsequently described.

The subcarrier mapping unit 916 determines association of the precoding vector selected by the selector 914 with a subcarrier and transmits the determined association to the precoding unit 906 via the mode switching unit 918.

The mode switching unit 918 switches operating modes for the transmitter in accordance with predefined determination criteria. As one example, the mode switching unit 918 may switch the operating modes depending on traveling speed of a communication opponent. In this example, if the communication opponent has a slow traveling speed, the mode switching unit 918 selects a closed-loop operating mode. On the other hand, if the communication opponent has a fast traveling speed, the mode switching unit 918 selects an open-loop operating mode. In another example, the mode switching unit 918 may change the operating modes in response to quality of an uplink or downlink communication signal being below a predefined value. The modes may be switched in response to a request from a user apparatus or depending on measurement values for the propagation environment. Also in the case where the transmitter determines that a precoding matrix may be erroneous in the closed-loop mode with high likelihood, the mode switching unit 918 may switch into the open-loop mode. In any case, the mode switch unit 918 may switch the operating modes in response to occurrence of predefined mode switching events in the transmitter.

[Operations of Transmitter: Closed-Loop]

As the operating modes for the transmitter, the closed-loop mode and the open-loop mode are provided. Under the closed-loop mode, operations similar to conventional ones are conducted. In this case, as stated in conjunction with FIGS. 1, 5 and 6, precoding vectors are modified into appropriate ones depending on feedback signals (PMIs) supplied from communication opponents. Typically, the precoding vectors may be ones of a predefined number of vectors $U_1, U_2, \ldots, U_P$ stored in the codebook 912 in advance. The PMIs identify any of the vectors $U_1, U_2, \ldots, U_P$. More generally, the precoding vectors may not be alternative selections and may be adjusted adaptively into any appropriate vectors. Preferably, candidate vectors of the precoding vectors may be limited to appropriate selections in order to reduce the operating workload on vector control and enable adaptive control. The precoding vectors must be switched adaptively under the closed-loop operating mode depending on locations of communication opponents. Thus, the closed-loop operating mode may work better for fast traveling communication opponents than for slowly traveling communication opponents from the viewpoint of quality improvement.

[Operations of Transmitter: Open-Loop]

Figure 7:
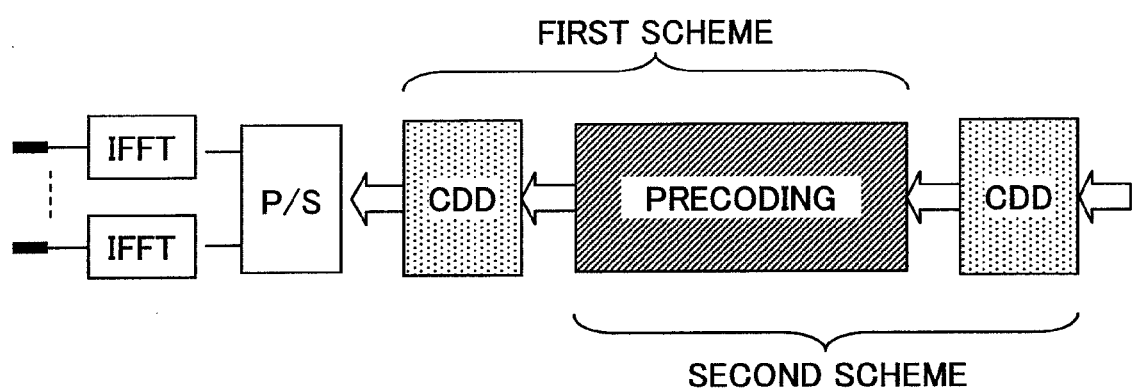
FIG. 7 illustrates an exemplary arrangement of a transmitter capable of switching a first scheme and a second scheme.

In the case where a communication opponent travels fast, it is difficult to switch the precoding vectors adaptively. In this case, the quality improvement due to delay diversity CDD may be advantageous compared to the quality improvement due to the precoding vector switching. In order to reinforce the effect of the quality improvement due to the CDD, computing operations for the CDD may be conducted after precoding operations. To do so, however, the transmitter must have the circuit structure as illustrated in FIG. 7, resulting in a complicated arrangement of the transmitter.

Figure 4:
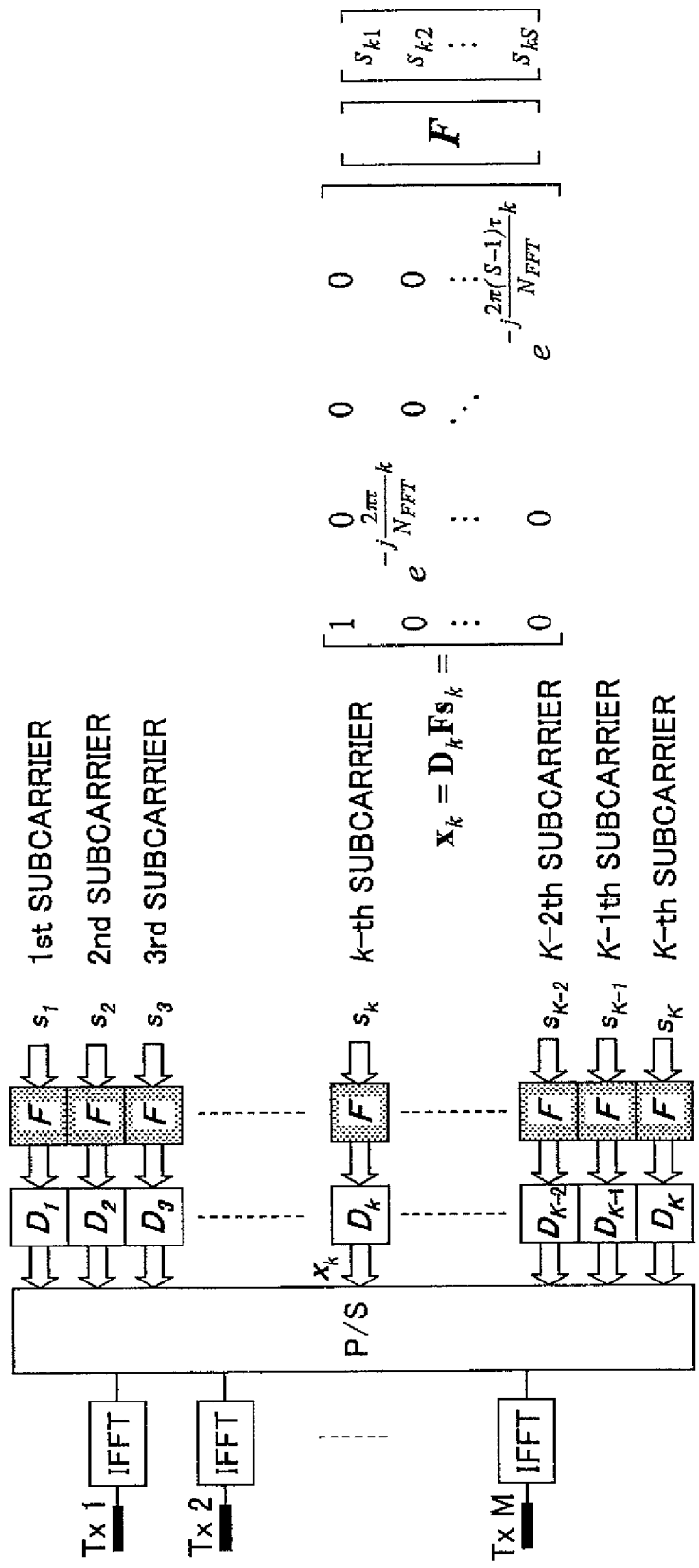
FIG. 4 illustrates the transmitter in detail.

Meanwhile, as illustrated in FIG. 4, computing operations to implement the delay diversity CDD at a frequency domain may be represented through operations on a signal component of the k-th subcarrier and a certain matrix $D_k$. More specifically, the computing operations may be represented through multiplications of $\exp(-j\ (2\pi m\tau/N_{FFT})k)$ (where $m=0, \ldots, M-1$) with a number of signal components corresponding to the number (S) of streams transmitted in a certain subcarrier. S represents the number of transmitted streams ($S \leq M$), M represents the number of transmit antennas, $N_{FFT}$ represents the number of signal processing points in Fourier transform and inverse Fourier transform, and $\tau$ represents a delay amount in the CDD. If different weights are multiplied with respective subcarrier signal components for different subcarriers, the resulting signals may have some delay diversity effects. Based on the above investigation, the present inventors have discovered a scheme for using different precoding vectors for individual subcarriers to present the delay diversity effect without duplicated provision of operating units for the CDD.

Figure 10:
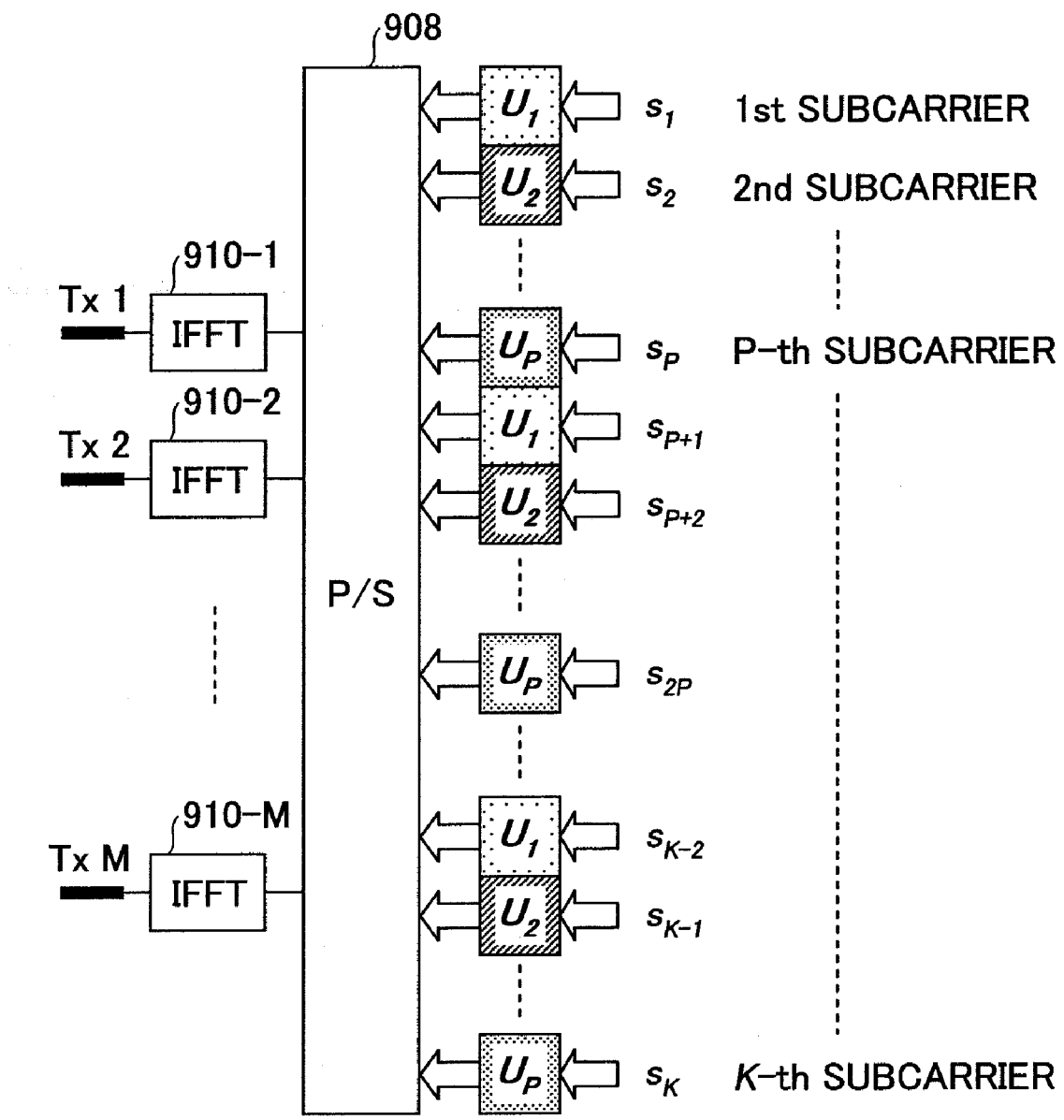
FIG. 10 schematically illustrates computing operations at precoders according to a first embodiment of the present invention.

FIG. 10 schematically illustrates exemplary computing operations at the precoders in FIG. 9. Unlike conventional schemes, different precoding vectors are used at the individual precoders. For example, the precoding vector $U_1$ is applied to the first subcarrier $s_1$, the precoding vector $U_2$ is applied to the second subcarrier $s_2, \ldots$, and the precoding vector $U_P$ is applied to the P-th subcarrier $s_P$. For the (P+1)-th and subsequent subcarriers, the precoding vectors $U_1$, $U_2, \ldots, U_P$ are repeatedly used. The precoding vectors $U_1$, $U_2, \ldots, U_P$ are stored in the codebook 912 in advance and are the same as those used for the closed-loop mode. In order to use different vectors for the respective subcarriers, vectors other than the vectors $U_1, U_2, \ldots, U_P$ provided for the closed-loop mode in advance may be provided and used in the open-loop mode. Note that the vectors are preferably selected from the same codebook 912 in both the closed-loop mode and the open-loop mode in order to achieve shared processing elements and a reduced amount of memory while receiving benefit of the quality improvement effect due to the CDD.

As stated above, the precoding vectors $U_1, U_2, \ldots, U_P$ are the same as those used for the closed-loop mode and switched under the closed-loop mode depending on locations of communication opponents (user apparatuses). Thus, the precoding vectors $U_1, U_2, \ldots, U_P$ can be associated with P different directional beams. As illustrated in FIG. 10, iterative applications of the P precoding vectors to individual subcarriers in an open-loop manner correspond to transmission of certain subcarriers toward certain directions including transmissions of (jP+1)-th subcarriers (j=0, 1, 2, . . . ) (ex. $1^{st}$, (P+1)-th, (2P+1)-th, . . . ) toward the $U_1$ direction, transmissions of (jP+2)-th subcarriers (ex. $2^{nd}$, (P+2)-th, (2P+2)-th, . . . ) toward the $U_2$ direction and so on. Thus, individual signal components within the frequency band are separately distributed over P different directions, which is preferable for improvement of signal diversity effect.

In the illustrated example, the total number K ($=N_{FFT}$) of subcarriers is set to be a multiple number of the number P of vectors stored in the codebook 912, although the present invention is not limited to it. This enables P different vectors to be used evenly over the whole frequency band, which is preferable for uniform signal quality.

Figure 11:
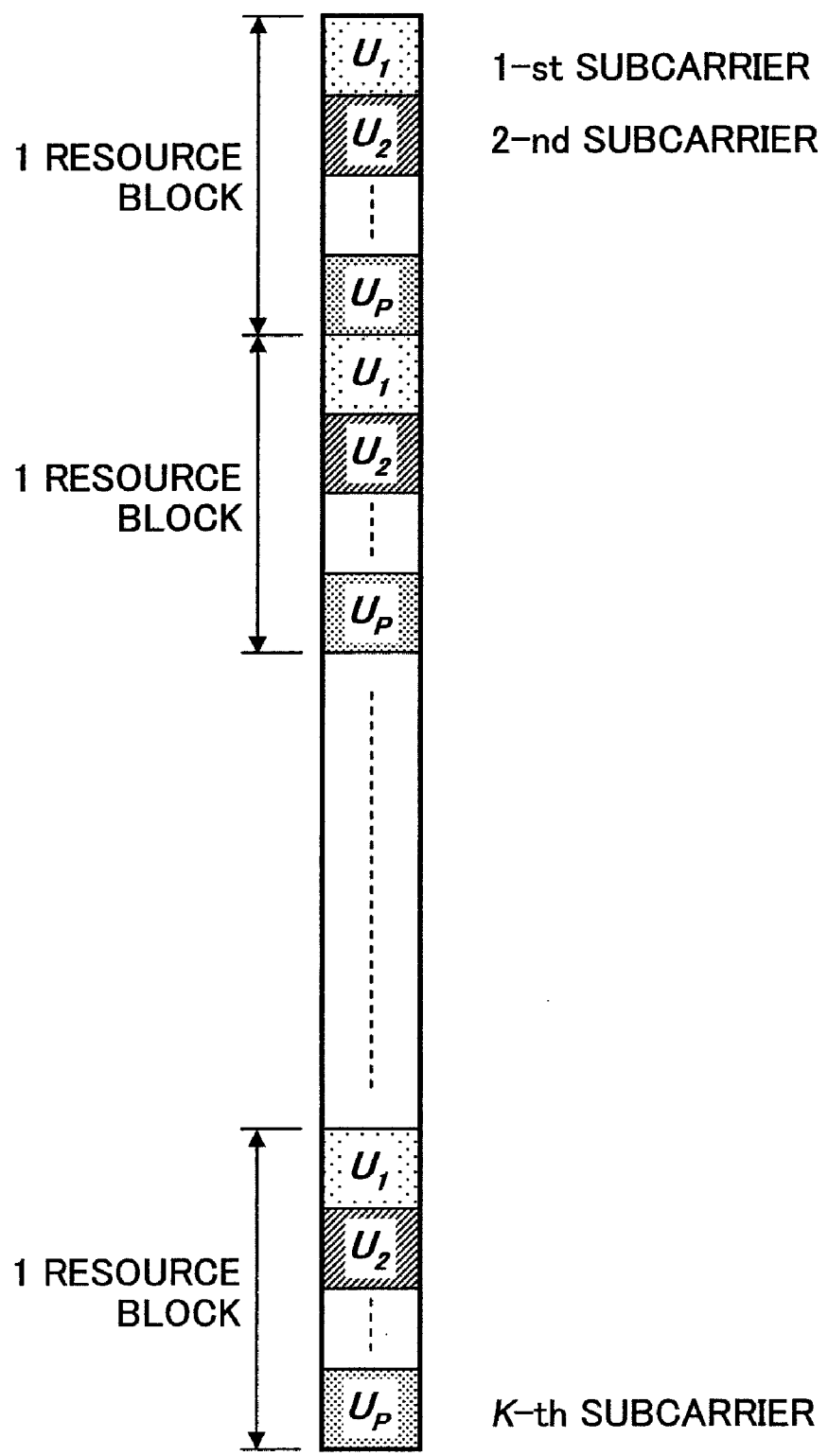
FIG. 11 schematically illustrates an exemplary association between precoding vectors and subcarriers.

In FIG. 11, in addition to the total number K ($=N_{FFT}$) of subcarriers being a multiple number of the number P of vectors stored in the codebook 912, P corresponds to the total number of subcarriers included in a unitary resource block. Downlink radio resources are assigned for user apparatuses where resources having a certain bandwidth (ex. twelve subcarriers) and a certain duration (ex. 1 ms) are configured as one unit. The illustrated embodiment is preferred for improved uniform quality of resource blocks.

Figure 12A:
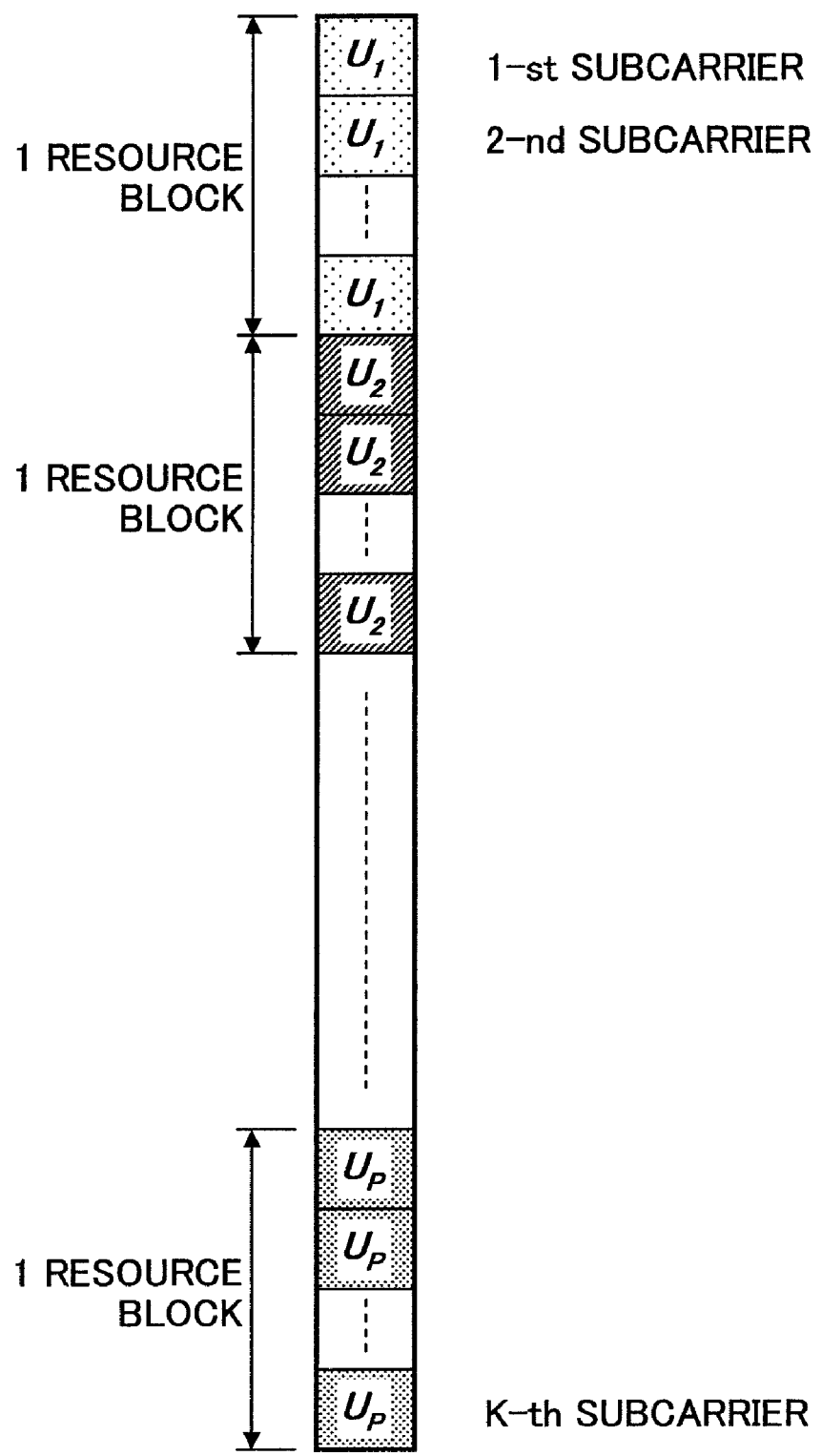
FIG. 12A schematically illustrates an exemplary association between precoding vectors and subcarriers.
Figure 12B:
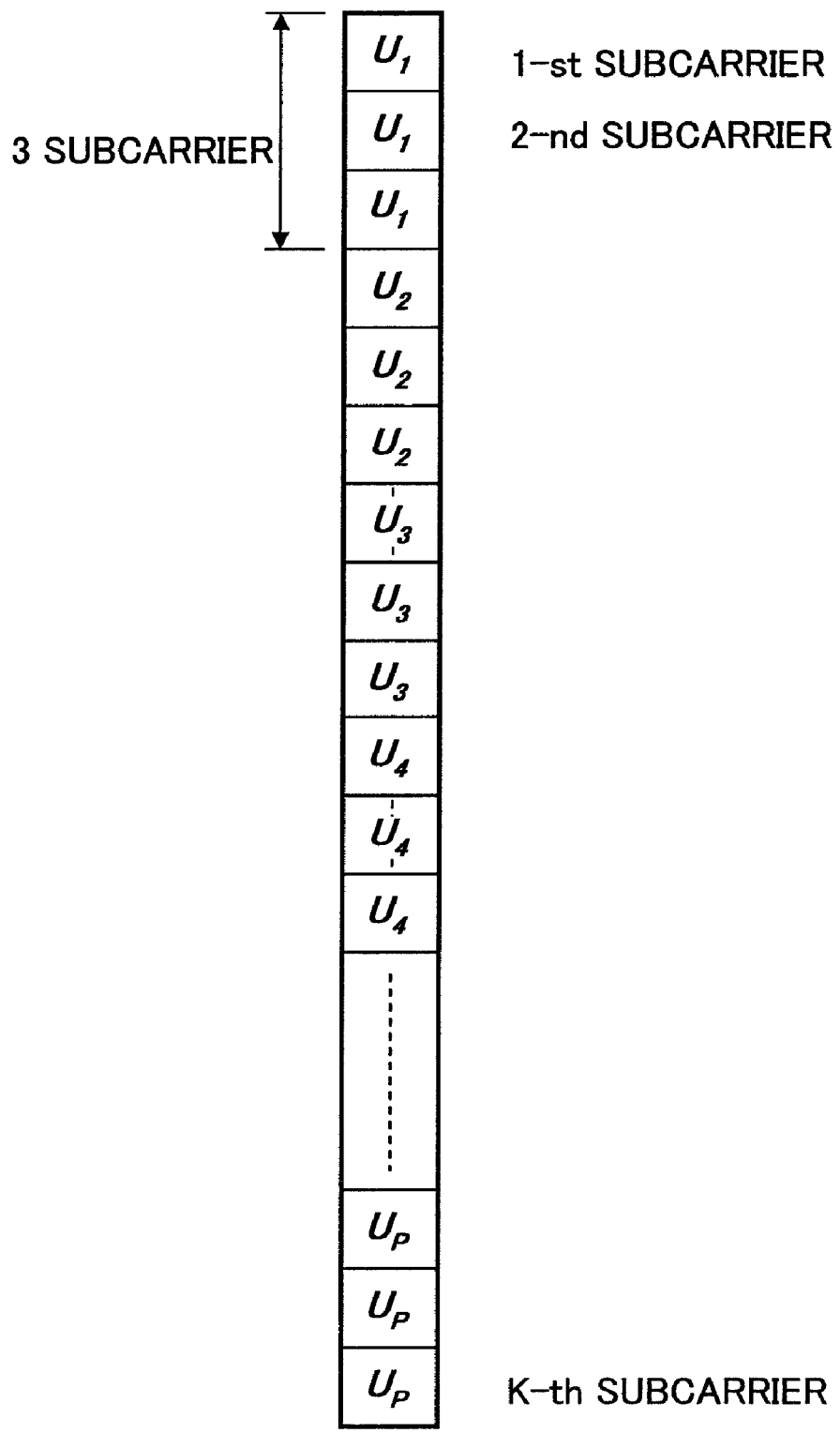
FIG. 12B schematically illustrates another exemplary association between precoding vectors and subcarriers.

In FIG. 12A, a single type of precoding vector is fixed and used for a single resource block, and different types of precoding vectors are used for adjacent resource blocks. The illustrated embodiment is preferred for accurate measurement of noise levels and interference levels for resource blocks. Since the noise level and the interference level for the individual resource blocks (RBs) can be used as a basis for resource assignment and/or others, accurate estimation of the noise level and the interference level is preferred for appropriate scheduling. More generally, any number of adjacent subcarriers may be used for the same precoding vector. In FIG. 12B, precoding matrices are applied every three subcarriers in a circulated manner.

In the above-mentioned embodiments, all the P precoding vectors provided for the closed-loop mode are also used in the open-loop mode, but the present invention is not limited to it. Only a portion of the P precoding vectors stored in the codebook 912 may be used in the open-loop mode.

Also, the number S of spatially multiplexed signals may be variable depending on propagation environment in a MIMO system. In one embodiment of the present invention, mapping of precoding matrices into subcarriers may be variable depending on the number S of spatially multiplexed signals. For example, in case of S=1, which may facilitate greater precoding gain, the same precoding matrix (ex. $U_1$) is used for all subcarriers for enhanced precoding gain. If S is more than or equal to two, circulated assignment using multiple precoding matrices may be used for enhanced diversity gain, as illustrated in FIG. 11.

[Variation]

Figure 13:
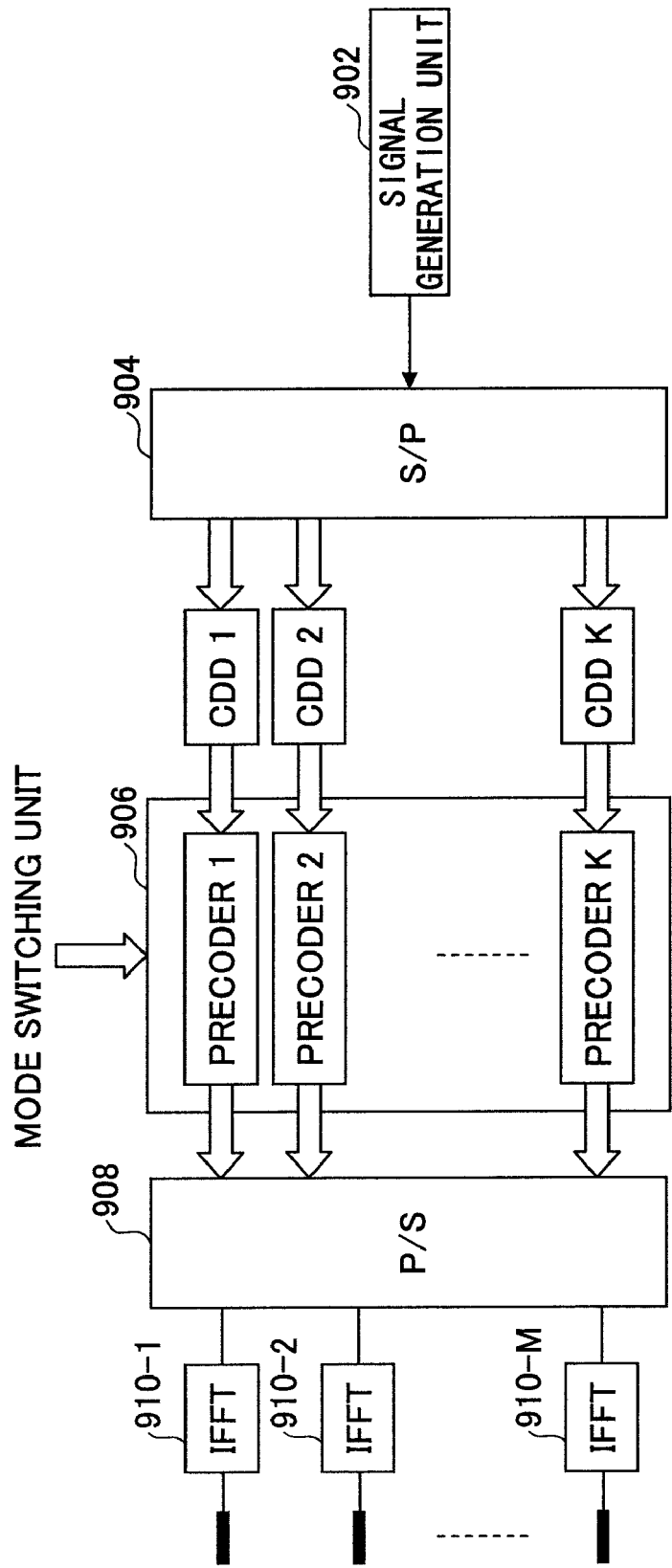
FIG. 13 is a functional block diagram illustrating a variation of a transmitter.

In the embodiment illustrated in FIG. 10, for simplicity, only different precoding vectors for individual subcarriers are used at the precoders 1 through K, which can gain significant delay diversity effect even in the open-loop mode. In this case, it is not essential that incoming signals to the precoders 1 through K are supplied from the serial to parallel conversion unit 904. As illustrated in FIG. 13, processing elements CDD 1 through CCD K for the CCD for use in the closed-loop mode may be used similarly.

Second Embodiment

In the first embodiment, distinct precoding vectors are applied to different subcarriers, but in the second embodiment of the present invention, distinct precoding vectors are applied to the same subcarrier at different time points.

Figure 14:
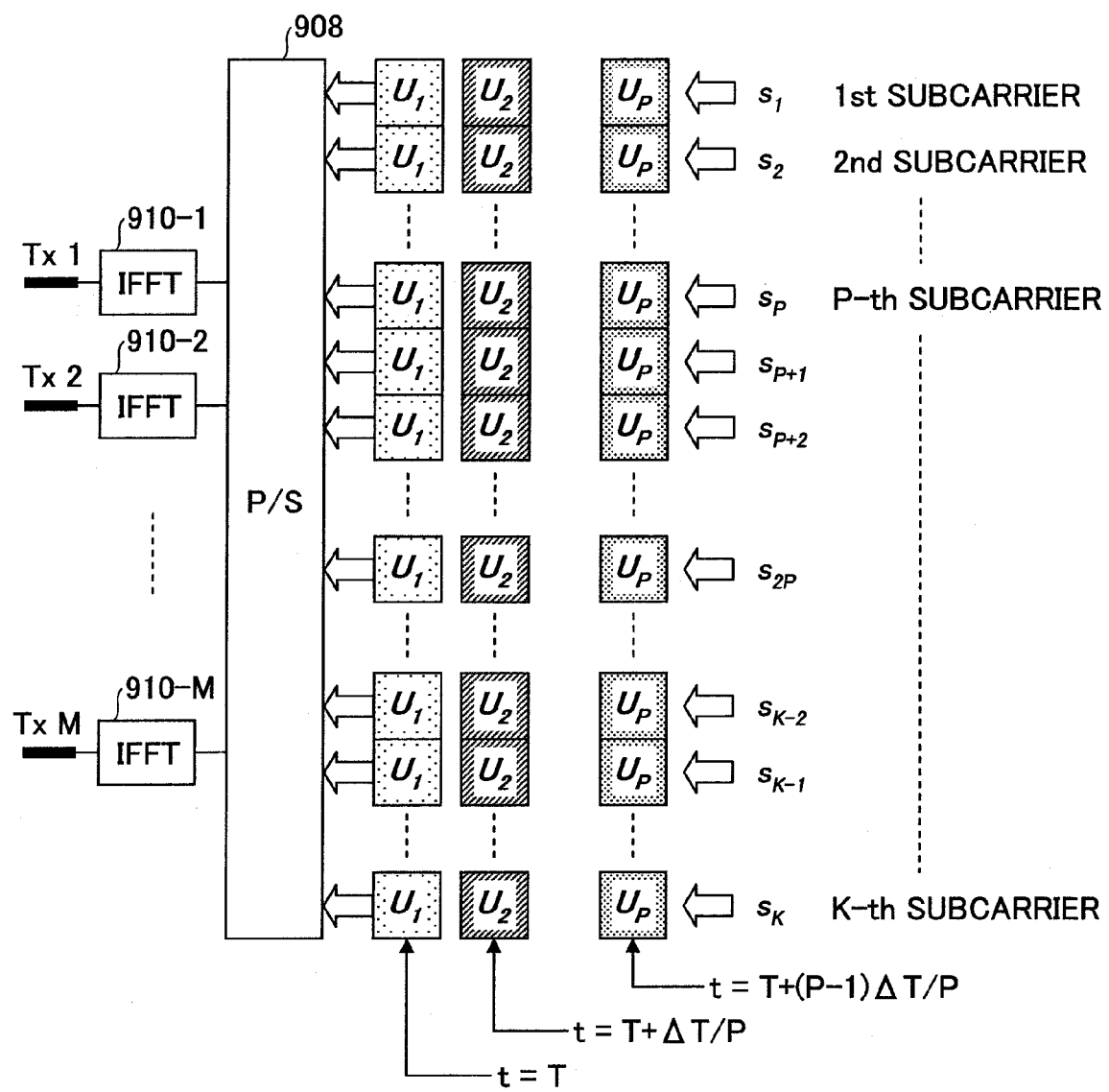
FIG. 14 schematically illustrates computing operations at precoders according to a second embodiment of the present invention.

FIG. 14 schematically illustrates an exemplary computing operation at the precoders in FIG. 9 according to the second embodiment. At a certain time point (t=T), the precoding vector $U_1$ is commonly applied to all subcarriers. In another time point (t=T+ΔT/P), the precoding vector $U_2$ is commonly applied to all the subcarriers. In a further other time point (t=T+ΔT(P−1)/P), the precoding vector $U_P$ is commonly applied to all the subcarriers. In this manner, the precoding vectors $U_1, U_2, \ldots, U_P$ are switchably used for all the subcarriers over a certain duration ΔT. ΔT is set to be larger than a duration enough to switch the P precoding vectors successively.

As mentioned above, the precoding vectors $U_1 U_2, \ldots, U_P$ can be considered in association with P different directional beams. In this embodiment, the precoding vectors commonly used for all the subcarriers are switched in order of $U_1$, $U_2, \ldots, U_P$ during the ΔT. This means that signals are transmitted in a frequency band in the $U_1$ direction at a certain time point, in the $U_2$ direction at the next time point, . . . , and in the $U_P$ direction at the P-th time point and that the same operations are subsequently performed in a cyclic manner. Note that the precoding vectors are switched with regardless of locations of communication opponents unlike conventional schemes. In the first embodiment, signals components for subcarriers within a predefined frequency band are simultaneously distributed in P different directions. In the second embodiment, the signal components for subcarriers are instantaneously directed in a certain direction, but the signal components are exhaustively distributed in all the P different directions over the ΔT duration. This embodiment is also preferred for enhanced delay diversity effect.

Third Embodiment

In the third embodiment, the scheme according to the first embodiment is combined with the scheme according to the second embodiment. In other words, distinct precoding vectors are applied to different subcarriers and are applied to the same subcarriers at different time points.

Figure 15:
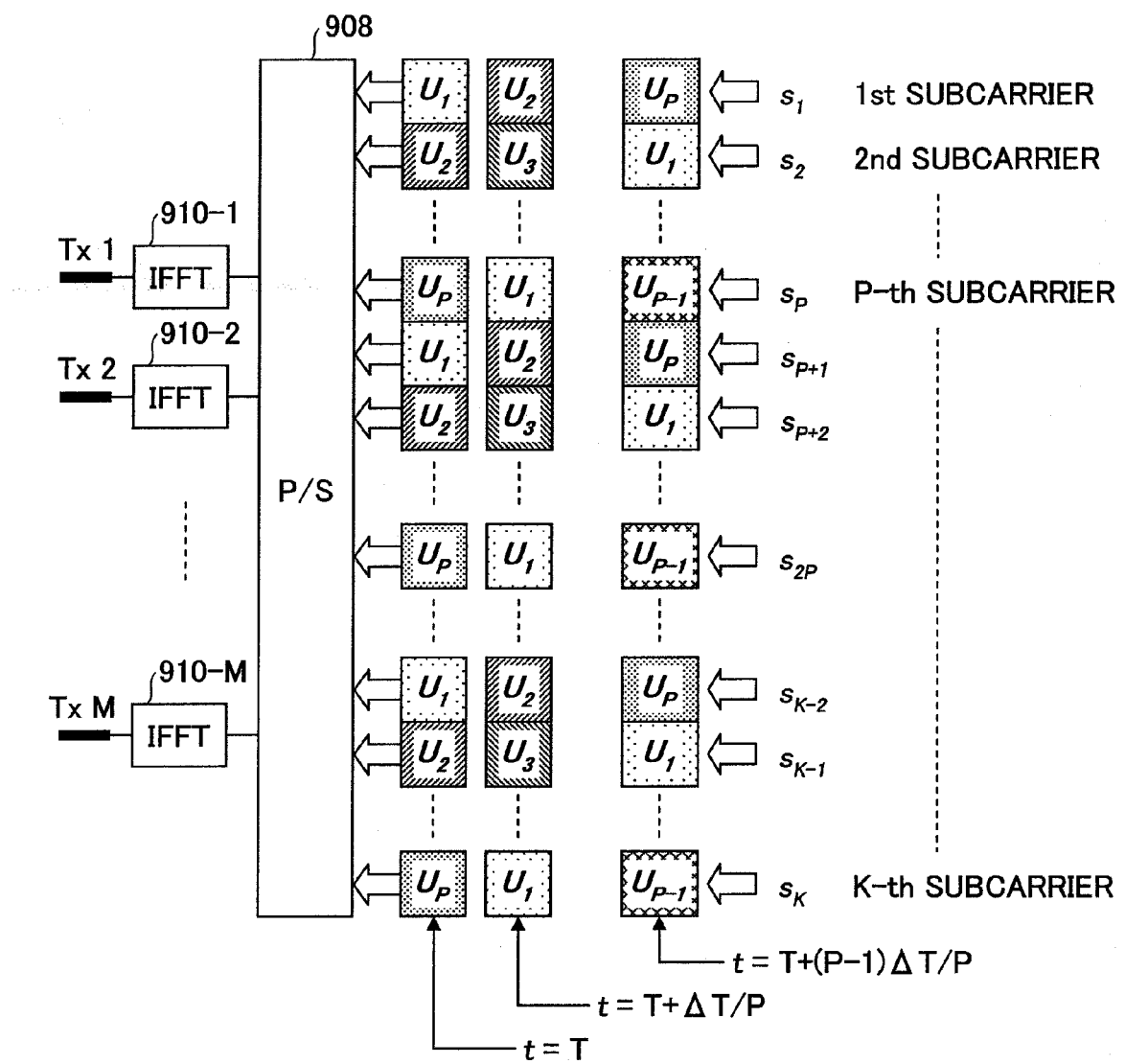
FIG. 15 schematically illustrates operations at precoders according to a third embodiment of the present invention.

As illustrated in FIG. 15, the precoding vectors $U_1, \ldots, U_P$ are cyclically applied to subcarriers 1 through K at a certain time point (t=T). At another time point (t=T+ΔT/P), the precoding vectors $U_2, \ldots, U_{P-1}, U_P$ are cyclically applied to the subcarriers 1 through K. Then, at a certain time point (t=T+ΔT(P−1)/P), the precoding vectors $U_P, U_1, \ldots, U_{P-1}$ are cyclically applied to the subcarriers 1 through K. The methods as above-mentioned in conjunction with FIGS. 11 and 12 may be used as to how to use the P precoding vectors.

According to this embodiment, the subcarrier components are distributed with respect to both the frequency direction and the temporal direction, which is preferred for enhanced delay diversity effect.

In any of the above embodiments, there may be several types of associations for different precoding matrices and different signal sequences. These associations may be selectively applied depending on requests from user apparatuses or determination of base stations. For example, the associations may be switched over a relatively long time period.

Fourth Embodiment

Simulation results of a transmitter according to one embodiment of the present invention are described with reference to FIGS. 16 and 17. In the simulations, parameters set forth are used.

The number of OFDM subcarriers $N_{FFT}$: 120
The number of precoding vectors P: 12
The number of subcarriers within one resource block: 12
Radio transmission channel: correlated channel or uncorrelated channel
Traveling speed of a user apparatus working as a receiver: 60 km/h
It is supposed that CQI-based adaptive modulation coding is applied in the simulations.

Figure 16:
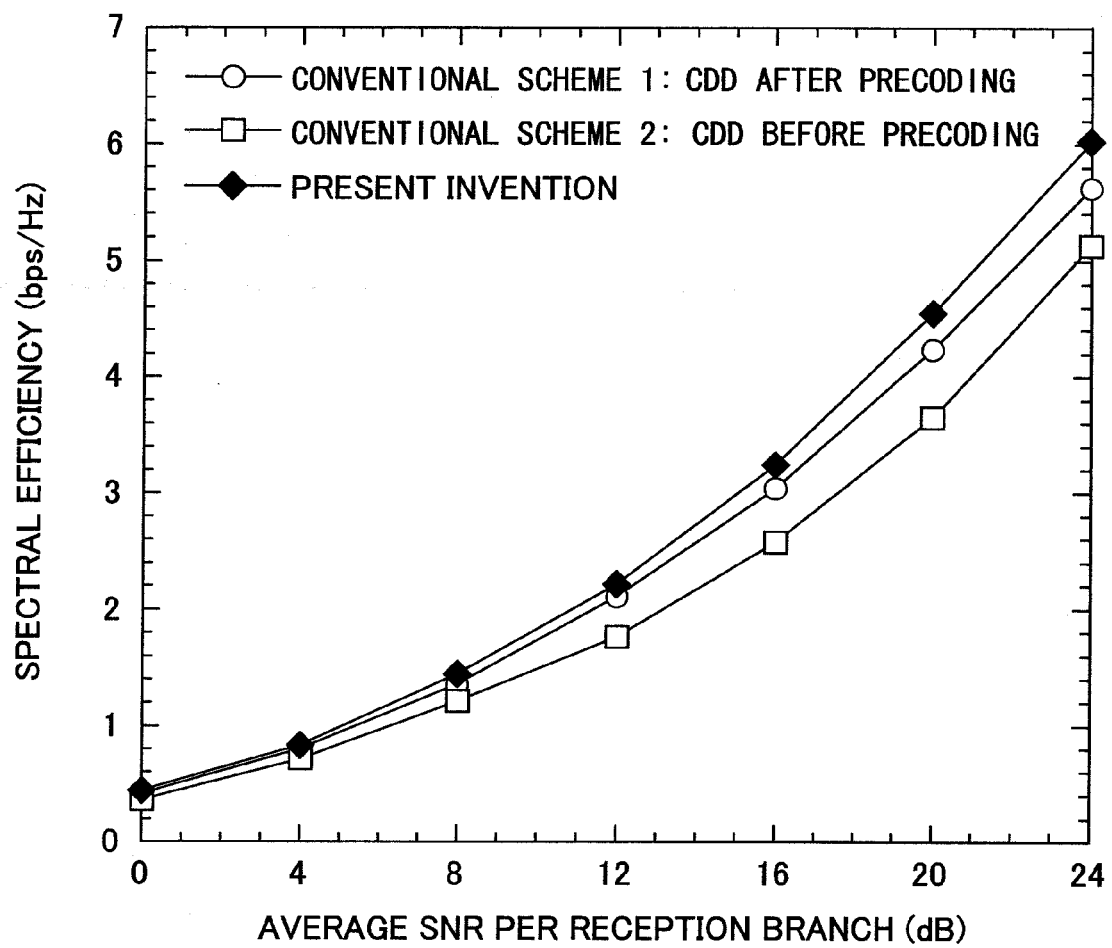
FIG. 16 illustrates an exemplary simulation result in case of $(N_{Tx}, N_{Rx})=(4, 2)$ and uncorrelated channels.

A graph in FIG. 16 illustrates the relationship between average SNR (dB) and spectral efficiency (bps/Hz) in case of 2 transmit antennas and 4 receive antennas. The average SNR (dB) in the horizontal axis indicates that it is worse toward the left side and better toward the right side. The spectral efficiency in the vertical axis indicates throughput per unit band (successfully received data amount per unit time). Thus, as the average SNR is worse, the throughput is lower. This corresponds to a user residing away from a base station or a fast moving user, for example. On the other hand, as the average SNR is better, the throughput is higher. This corresponds to a user residing near a base station or a slowly moving user, for example. In the illustrated simulation, it is assumed that radio transmission channels are uncorrelated, that is, that radio transmission channels between transmit antennas and receive antennas are independent of each other.

Figure 3:
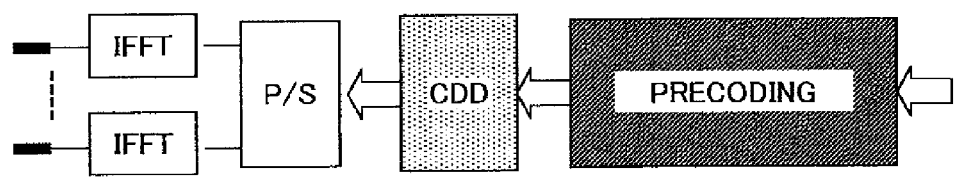
FIG. 3 schematically illustrates a first arrangement of a transmitter enabling CDD and precoding.

In the illustration, a graph represented by "○" labeled plots shows a graph obtained in a conventional transmitter as illustrated in FIGS. 3 and 4, which is referred to as conventional scheme 1 for simplicity. This transmitter performs CDD operations after precoding operations and is suitable for the closed-loop control. A graph represented by "□" labeled plots shows a graph obtained in another conventional transmitter as illustrated in FIGS. 5 and 6, which is referred to as conventional scheme 2 for simplicity. This transmitter performs CDD operations before precoding operations and is suitable for the open-loop control. A graph represented by "♦" labeled plots shows a graph obtained in a transmitter according to the present invention, that is, a transmitter operating in the open-loop mode. As illustrated, if the traveling speed is about 60 km/h, it is shown that the conventional scheme 1 has better characteristics than the conventional scheme 2 in that the closed-loop control is advantageous. The transmitter operating switchably between the closed-loop mode and the open-loop mode according to the present invention exerts as much delay diversity effect as the conventional scheme 1 even under the open-loop mode.

Figure 17:
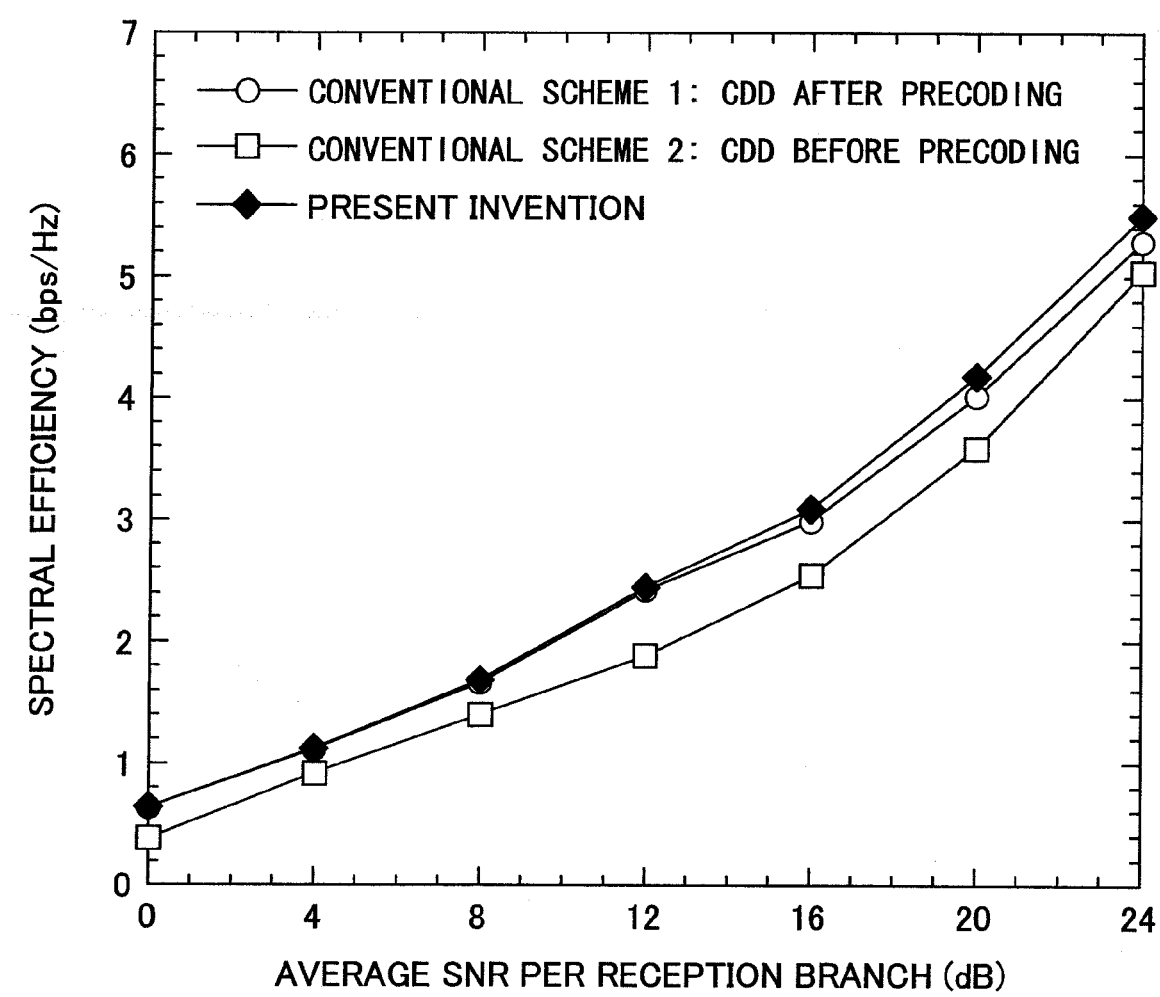
FIG. 17 illustrates an exemplary simulation result in case of $(N_{Tx}, N_{Rx})=(4, 2)$ and correlated channels.

A graph in FIG. 17 is similar to FIG. 16 except that correlated channels are used as the radio transmission channels.

Although the present invention has been described by way of the above specific embodiments, these embodiments are only illustrative, and various variations, modifications, alterations, substitutions and/or others can be appreciated by those skilled in the art. Specific numerical values are used to facilitate understandings of the present invention, but unless specifically stated otherwise, they are simply illustrative, and any other appropriate values may be used. Separation of the embodiments is not essential to the present invention, and two or more of the embodiments may be combined as needed. For convenience of explanation, apparatuses according to the embodiments of the present invention have been described with reference to functional block diagrams, but these apparatuses may be implemented in hardware, software or combinations thereof. The present invention is not limited to the above embodiments, and variations, modifications, alterations and substitutions can be included in the present invention without deviating from the spirit of the present invention.

The invention claimed is:

1. A transmitter comprising:
   multiple transmit antennas;
   a conversion unit configured to generate multiple signal sequences corresponding to a predefined frequency bandwidth from one or more transmission streams associated with any of the transmit antennas;
   a precoding unit configured to weight the signal sequences with a precoding matrix selected from a codebook including multiple predefined precoding matrices; and
   a transmitting unit configured to convert an output signal from the precoding unit into a number of signals corresponding to the number of transmit antennas and transmit the converted signals from the transmit antennas, wherein
   the precoding unit applies distinct precoding matrices to different signal sequences, and
   an association between the distinct precoding matrices and the different signal sequences is determined through open-loop control being independent of a feedback from a receiver.

2. The transmitter as claimed in claim 1, wherein the number of distinct precoding matrices is equal to an integral multiple of the total number of subcarriers for one of a predefined number of resource blocks included in the predefined frequency bandwidth or a submultiple of the total number of subcarriers included in the predefined frequency bandwidth.

3. The transmitter as claimed in claim 1, wherein multiple precoding matrices are cyclically used for different signal sequences or at different time points.

4. The transmitter as claimed in claim 1, wherein a certain precoding matrix is commonly applied to multiple signal sequences corresponding to an adjacent subcarrier while another precoding matrix is commonly applied to multiple signal sequences corresponding to another adjacent subcarrier.

5. The transmitter as claimed in claim 4, further comprising:
   a delay diversity unit configured to weight multiple signal sequences supplied from the conversion unit for cyclic delay diversity,
   wherein output signals from the delay diversity unit is supplied to the precoding unit.

6. The transmitter as claimed in claim 1, wherein
   a certain precoding matrix is commonly applied to multiple signal sequences corresponding to an adjacent subcarrier while another precoding matrix is commonly applied to multiple signal sequences corresponding to another adjacent subcarrier, and multiple precoding matrices are cyclically used.

7. The transmitter as claimed in claim 6, wherein the transmitter has operating modes including an openloop mode and a closed-loop mode, and at least a portion of the precoding matrices used in the precoding unit is selected from the codebook under the closed-loop mode depending on a feedback signal from a communication opponent of the transmitter.

8. The transmitter as claimed in claim 7, wherein the operating modes are switched depending on sufficiency of a predefined condition at the transmitter.

9. The transmitter as claimed in claim 8, wherein upon detection of an error in feedback information under the closed-loop mode, the closed-loop mode is switched into the open-loop mode.

10. The transmitter as claimed in claim 6, further comprising:

a delay diversity unit configured to weight multiple signal sequences supplied from the conversion unit for cyclic delay diversity, wherein output signals from the delay diversity unit is supplied to the precoding unit.

11. The transmitter as claimed in claim 1, further comprising:

a delay diversity unit configured to weight multiple signal sequences supplied from the conversion unit for cyclic delay diversity, wherein output signals from the delay diversity unit are supplied to the precoding unit.

12. The transmitter as claimed in claim 1, wherein different associations between the distinct precoding matrices and the different signal sequences are applied depending on the number of transmission streams and the number of transmit antennas.

13. The transmitter as claimed in claim 1, wherein there are multiple different associations between the distinct precoding matrices and the different signal sequences, and the associations are switched upon a predefined condition being satisfied at the transmitter.

14. The transmitter as claimed in claim 1, wherein there are multiple different associations between the distinct precoding matrices and the different signal sequences, and the associations are selectively applied depending on user apparatuses.

15. The transmitter as claimed in claim 1, wherein there are multiple different associations between the distinct precoding matrices and the different signal sequences, and the associations are switched depending on an uplink signal from a user apparatus.

16. A transmitter comprising:

multiple transmit antennas;

a conversion unit configured to generate multiple signal sequences corresponding to a predefined frequency bandwidth from one or more transmission streams associated with any of the transmit antennas;

a precoding unit configured to weight the signal sequences with a precoding matrix selected from a codebook including multiple predefined precoding matrices; and a transmitting unit configured to convert an output signal from the precoding unit into a number of signals corresponding to the number of transmit antennas and transmit the converted signals from the transmit antennas, wherein the precoding unit applies distinct precoding matrices to an identical signal sequence at different time points, and an association between the distinct precoding matrices and the different time points is determined through openloop control being independent of a feedback from a receiver.

17. The transmitter as claimed in claim 16, wherein different associations between the distinct precoding matrices and the different time points are applied depending on the number of transmission streams.

18. The transmitter as claimed in claim 16, wherein there are multiple different associations between the distinct precoding matrices and the different time points, and the associations are selectively applied depending on user apparatuses.

19. The transmitter as claimed in claim 16, wherein there are multiple different associations between the distinct precoding matrices and the different time points, and the associations are switched depending on an uplink signal from a user apparatus.

20. The transmitter as claimed in claim 16, wherein multiple precoding matrices are cyclically used for different signal sequences or at different time points.

21. The transmitter as claimed in claim 16, wherein a certain precoding matrix is commonly applied to multiple signal sequences corresponding to an adjacent subcarrier while another precoding matrix is commonly applied to multiple signal sequences corresponding to another adjacent subcarrier.

22. The transmitter as claimed in claim 21, further comprising:

a delay diversity unit configured to weight multiple signal sequences supplied from the conversion unit for cyclic delay diversity, wherein output signals from the delay diversity unit is supplied to the precoding unit.

23. The transmitter as claimed in claim 16, wherein a certain precoding matrix is commonly applied to multiple signal sequences corresponding to an adjacent subcarrier while another precoding matrix is commonly applied to multiple signal sequences corresponding to another adjacent subcarrier, and multiple precoding matrices are cyclically used.

24. The transmitter as claimed in claim 23, wherein the transmitter has operating modes including an openloop mode and a closed-loop mode, and at least a portion of the precoding matrices used in the precoding unit is selected from the codebook under the closed-loop mode depending on a feedback signal from a communication opponent of the transmitter.

25. The transmitter as claimed in claim 24, wherein the operating modes are switched depending on sufficiency of a predefined condition at the transmitter.

26. The transmitter as claimed in claim 25, wherein upon detection of an error in feedback information under the closed-loop mode, the closed-loop mode is switched into the open-loop mode.

27. The transmitter as claimed in claim 23, further comprising:

a delay diversity unit configured to weight multiple signal sequences supplied from the conversion unit for cyclic delay diversity, wherein output signals from the delay diversity unit is supplied to the precoding unit.

28. The transmitter as claimed in claim 16, further comprising:
a delay diversity unit configured to weight multiple signal sequences supplied from the conversion unit for cyclic delay diversity,
wherein output signals from the delay diversity unit are supplied to the precoding unit.

29. A transmitter comprising:
multiple transmit antennas;
a conversion unit configured to generate multiple signal sequences corresponding to a predefined frequency bandwidth from one or more transmission streams associated with any of the transmit antennas;
a precoding unit configured to weight the signal sequences with a precoding matrix; and
a transmitting unit configured to convert an output signal from the precoding unit into a number of signals corresponding to the number of transmit antennas and transmit the converted signals from the transmit antennas, wherein
the precoding unit applies distinct precoding matrices to different signal sequences and applies the distinct precoding matrices to an identical signal sequence at different time points.

30. The transmitter as claimed in claim 29, wherein the precoding matrices used in the precoding unit are selected from a codebook including multiple predefined precoding matrices.

31. The transmitter as claimed in claim 29, wherein the number of distinct precoding matrices is equal to an integral multiple of the total number of subcarriers for one of a predefined number of resource blocks included in the predefined frequency bandwidth or a submultiple of the total number of subcarriers included in the predefined frequency bandwidth.

32. The transmitter as claimed in claim 29, wherein multiple precoding matrices are cyclically used for different signal sequences or at different time points.

33. The transmitter as claimed in claim 29, wherein a certain precoding matrix is commonly applied to multiple signal sequences corresponding to an adjacent subcarrier while another precoding matrix is commonly applied to multiple signal sequences corresponding to another adjacent subcarrier.

34. The transmitter as claimed in claim 33, further comprising:
a delay diversity unit configured to weight multiple signal sequences supplied from the conversion unit for cyclic delay diversity,
wherein output signals from the delay diversity unit is supplied to the precoding unit.

35. The transmitter as claimed in claim 29, wherein
a certain precoding matrix is commonly applied to multiple signal sequences corresponding to an adjacent subcarrier while another precoding matrix is commonly applied to multiple signal sequences corresponding to another adjacent subcarrier, and
multiple precoding matrices are cyclically used.

36. The transmitter as claimed in claim 35, wherein
the transmitter has operating modes including an open-loop mode and a closed-loop mode, and
at least a portion of the precoding matrices used in the precoding unit is selected from the codebook under the closed-loop mode depending on a feedback signal from a communication opponent of the transmitter.

37. The transmitter as claimed in claim 36, wherein the operating modes are switched depending on sufficiency of a predefined condition at the transmitter.

38. The transmitter as claimed in claim 37, wherein upon detection of an error in feedback information under the closed-loop mode, the closed-loop mode is switched into the open-loop mode.

39. The transmitter as claimed in claim 35, further comprising:
a delay diversity unit configured to weight multiple signal sequences supplied from the conversion unit for cyclic delay diversity,
wherein output signals from the delay diversity unit is supplied to the precoding unit.

40. The transmitter as claimed in claim 29, further comprising:
a delay diversity unit configured to weight multiple signal sequences supplied from the conversion unit for cyclic delay diversity,
wherein output signals from the delay diversity unit are supplied to the precoding unit.

41. The transmitter as claimed in claim 29, wherein different associations between the distinct precoding matrices and the different signal sequences are applied depending on the number of transmission streams and the number of transmit antennas.

42. The transmitter as claimed in claim 29, wherein
there are multiple different associations between the distinct precoding matrices and the different signal sequences, and
the associations are switched upon a predefined condition being satisfied at the transmitter.

43. The transmitter as claimed in claim 29, wherein
there are multiple different associations between the distinct precoding matrices and the different signal sequences, and
the associations are selectively applied depending on user apparatuses.

44. The transmitter as claimed in claim 29, wherein
there are multiple different associations between the distinct precoding matrices and the different signal sequences, and
the associations are switched depending on an uplink signal from a user apparatus.

45. The transmitter as claimed in claim 29, wherein different associations between the distinct precoding matrices and the different time points are applied depending on the number of transmission streams.

46. The transmitter as claimed in claim 29, wherein
there are multiple different associations between the distinct precoding matrices and the different time points, and
the associations are selectively applied depending on user apparatuses.

47. The transmitter as claimed in claim 29, wherein
there are multiple different associations between the distinct precoding matrices and the different time points, and
the associations are switched depending on an uplink signal from a user apparatus.

48. A transmission method for use in a transmitter including multiple transmit antennas, the method comprising:
a conversion step of generating multiple signal sequences corresponding to a predefined frequency bandwidth from one or more transmission streams associated with any of the transmit antennas;

a precoding step of weighting the signal sequences with a precoding matrix selected from a codebook including multiple predefined precoding matrices; and a transmitting step of converting an output signal from the precoding step into a number of signals corresponding to the number of transmit antennas and transmitting the converted signals from the transmit antennas, wherein the precoding step comprises applying distinct precoding matrices to different signal sequences, and an association between the distinct precoding matrices and the different signal sequences is determined through open-loop control being independent of a feedback from a receiver.

49. A transmission method for use in a transmitter including multiple transmit antennas, the method comprising:

a conversion step of generating multiple signal sequences corresponding to a predefined frequency bandwidth from one or more transmission streams associated with any of the transmit antennas;

a precoding step of weighting the signal sequences with a precoding matrix selected from a codebook including multiple predefined precoding matrices; and a transmitting step of converting an output signal from the precoding step into a number of signals corresponding to the number of transmit antennas and transmitting the converted signals from the transmit antennas, wherein the precoding step comprises applying distinct precoding matrices to an identical signal sequence at different time points, and an association between the distinct precoding matrices and the different time points is determined through open-loop control being independent of a feedback from a receiver.

50. A transmission method for use in a transmitter including multiple transmit antennas, the method comprising:

a conversion step of generating multiple signal sequences corresponding to a predefined frequency bandwidth from one or more transmission streams associated with any of the transmit antennas;

a precoding step of weighting the signal sequences with a precoding matrix; and a transmitting step of converting an output signal from the precoding step into a number of signals corresponding to the number of transmit antennas and transmitting the converted signals from the transmit antennas, wherein the precoding step comprises applying distinct precoding matrices to different signal sequences and applying the distinct precoding matrices to an identical signal sequence at different time points.

51. The transmitter as claimed in claim 16, wherein the number of distinct precoding matrices is equal to an integral multiple of the total number of subcarriers for one of a predefined number of resource blocks included in the predefined frequency bandwidth or a submultiple of the total number of subcarriers included in the predefined frequency bandwidth.

* * * * *